United States Patent
Shindo et al.

[11] 3,835,125
[45] Sept. 10, 1974

[54] BENZOTRIAZOCINE DERIVATIVES
[75] Inventors: Minoru Shindo, Tokyo; Morio Kakimoto, Yono; Hiroyuki Nagano, Ageo; Yasuo Fujimura, Tokyo, all of Japan
[73] Assignee: Chugai Seiyaku Kabushiki Kaisha, Tokyo, Japan
[22] Filed: Feb. 7, 1973
[21] Appl. No.: 330,240

[30] Foreign Application Priority Data
Feb. 18, 1972 Japan.......................... 47-16382

[52] U.S. Cl. ......................... 260/239.3 B, 424/244
[51] Int. Cl............................................ C07d 55/54
[58] Field of Search ............................ 260/239.3 B Primary Examiner—Norma S. Milestone
Assistant Examiner—Robert T. Bond
Attorney, Agent, or Firm—Browdy and Neimark

[57] ABSTRACT
Benzotriazocine derivatives represented by the formula

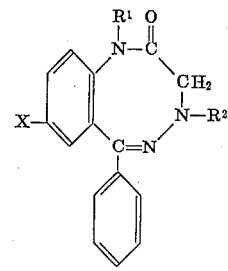

wherein X, represents a hydrogen atom, a halogen atom or an alkyl group, $R^1$ represents a dialkylaminoalkyl group or an aralkyl group, and $R^2$ represents a hydrogen atom or a halogenoacetyl group having useful pharmaceutical activities on the central nervous system, and processes for preparing the benzotriazocine derivatives are disclosed.

8 Claims, No Drawings

BENZOTRIAZOCINE DERIVATIVES

BACKGROUND OF THE INVENTION

FIELD OF THE INVENTION

This invention relates to benzotriazocine derivatives represented by the formula

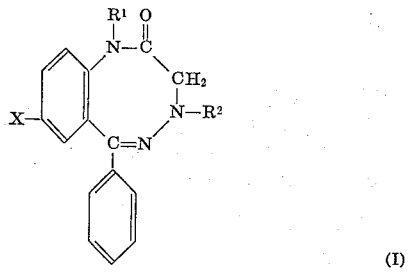

(I)

wherein X represents a hydrogen atom, a halogen atom or an alkyl group, $R^1$ represents a dialkylaminoalkyl group or an aralkyl group, and $R^2$ represents a hydrogen atom or a halogenoacetyl group, and processes for preparing the benzotriazocine derivatives.

The compounds represented by the formula (I) above are novel compounds previously not reported in the literature and exhibit neurotropic activities, in particular, activities on the central nervous system and, such therefore, useful as sedatives, tranquilizers, antidepressants, anti-convulsants and analgesics. In addition, the compounds of the present invention are of low toxicity. The activity of compounds of this type on the central nervous system can be demonstrated in mice in accordance with the procedure reported by W. L. Kuhn et al., *Journal of Pharmacology and Experimental Therapeutics*, 134, 60 (1961) and can be determined by orally administering the compounds and observing their activity for prolonging the sleeping time in mice induced by a subsequent intraperitoneal administration of soluble hexobarbital (sodium salt of hexobarbital).

Further, the analgesic activity can be demonstrated in mice in accordance with the electro-stimulation method reported by J. H. Burn, et al., *Biological Standardization*, Oxford Univ. Press (1950). This method comprises orally administering the test compound to mice and counting the number of electro-shocks given to the tail until the mice squeak. Alternatively, the analgesic activity can be determined by the acetic acid writhing method reported by R. Koster, et al., *Federation Proceedings*, 18, 412 (1959). This method comprises orally administering the test compound to mice and observing how said test compound works on the mice to inhibit their writhing which would otherwise be induced by the intraperitoneal administration of acetic acid.

The toxicity of the compounds can be indicated by an $LD_{50}$ value calculated from the oral dosage level required for killing 50 percent of the mice tested.

The compounds of this invention represented by the formula (I) above were found to be effective and of low toxicity in the above test procedures. For example, the compounds of the formula (I) wherein $R^1$ is a dialkylaminoalkyl group, more particularly, diethylaminoethyl group exhibit an inhibitory activity on the central nervous system (prolong sleeping time) on the order of 1.5 to 4 times that of control when the compounds are administered at a dosage level of from 5 to 20 mg per kg of body weight. On the other hand, the compounds of the formula (I) wherein $R^1$ is a dialkylaminoalkyl group, more particularly, dimethylaminoethyl group or diethylaminoethyl group exhibit an analgesic activity in the electro-stimulating method on the order of about 2 times that of the control 45 to 90 minutes after administration of the test compounds at a dosage level of 100 mg/kg. Also, the compounds of the formula (I) wherein $R^1$ is an aralkyl group and X is a halogen atom or an alkyl group exhibit greater than 70 percent inhibitory effect in the acetic acid writhing method.

On the other hand, the acute toxicity ($LD_{50}$) of the compounds of this invention was found to be from 600 to 1500 mg/kg.

The compounds represented by the formula (I) may be administered orally, subcutaneously or intravenously in their organic or inorganic acid addition salts. The dosage level of the compounds may be varied according to individual requirements and/or severity of conditions to be treated, but in most of the cases the compounds can be used in a single dosage level of from 1 to 100 mg/kg in warm blooded animals. The compounds may be administered in such dosage forms as isotonic aqueous solutions, elixirs, suspensions, capsules, tablets, powders and the like in combination with various pharmaceutical liquid or solid vehicles, carriers, excipients, etc. in accordance with the standard pharmaceutical practice.

SUMMARY OF THE INVENTION

The object of this invention is to provide novel benzotriazocine derivatives useful as pharmaceuticals.

Another object of this invention is to provide a process for preparing the benzotriazocine derivatives.

DETAILED DESCRIPTION OF THE INVENTION

The benzotriazocine derivatives having the above formula (I) wherein $R^2$ represents a hydrogen atom, i.e., the compounds represented by the formula

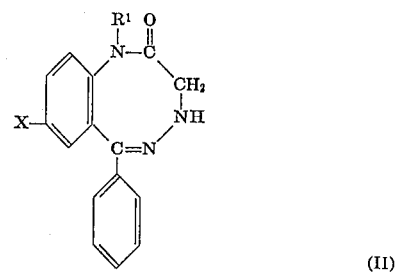

(II)

wherein X represents a hydrogen atom, a halogen atom or an alkyl group, and $R^1$ represents a dialkylaminoalkyl group or an aralkyl group, can be prepared by introducing a dialkyl aminoalkyl group or an aralkyl group into 1-position of 1-unsubstituted benzotriazocine derivatives represented by the formula

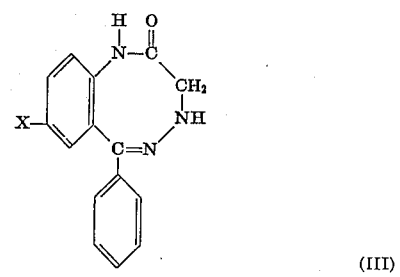

(III)

wherein X is as defined above.

In carrying out the process of this invention, any method for replacing a hydrogen atom of an amide group with an alkyl group or an aralkyl group can be used. For example, the benzotriazocine derivatives represented by the formula (II) can be prepared by reacting a compound represented by the formula (III) with a reactive ester of a dialkylaminoalkyl alcohol or a reactive ester of an aralkyl alcohol in the presence of a base.

Bases which can be used in the above reaction include, for example, alkali metal hydroxides such as sodium hydroxide, potassium hydroxide and the like, alcoholates such as sodium ethylate, sodium methylate and the like, and alkali metal hydrides such as sodium hydride and the like. Each of the bases may be used in an amount of from 0.01 to 10 molar equivalent, preferably, 1 to 2 molar equivalent on the basis of the compound represented by the formula (III).

Reactive esters of the dialkylaminoalkyl alcohol which can be used in the above reaction include, for example, dialkylaminoalkyl halides having one to four carbon atoms in the alkyl moiety such as dimethylaminoethyl chloride, dimethylaminoethyl bromide, diethylaminoethyl chloride, diethylaminoethyl bromide and the like. Reactive esters of the aralkyl alcohol which can be used in the above reaction include, for example, aralkyl halides such as benzyl chloride, benzyl bromide, benzyl iodide and the like. Each of the reactive esters may be used in an amount ranging from 1 to 100 molar equivalent, preferably, 1 to 2 molar equivalent based on the compound of the formula (III).

The reaction between the compounds (III) and the reactive ester can preferably be carried out in the presence of an inert solvent. Suitable examples of the solvent are lower alkanols such as methanol, ethanol and the like, benzene-series solvents such as benzene and toluene, lower alkylamidos such as dimethylformamide, and the like. The reaction proceeds at relatively low temperatures, but is preferably carried out at a temperature of from room temperature to an elevated temperature for a period of from several minutes to several hours.

The isolation of the desired product (II) from the reaction mixture can easily be effected by one of the well-known procedures. For example, the reaction mixture is extracted with an appropriate organic solvent such as chloroform, and, after removal of the solvent from the extract, the resulting product is purified by recrystallization of column chromatography using, for example, a silica gel column.

The compounds represented by the formula (II) wherein $R^1$ represents an aralkyl group can also be prepared from the compounds (I) wherein $R^1$ represents an aralkyl group and $R^2$ represents a halogenoacetyl group, i.e., 4-halogenoacetylbenzotriazocine derivatives represented by the formula

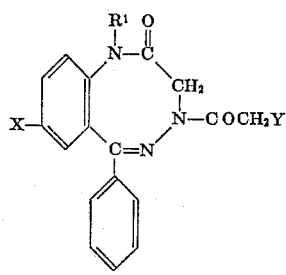

(IV)

wherein X is as defined above, and $R^1$ represents an aralkyl group and Y represents a halogen atom. The process described above comprises reacting the 4-halogenoacetyltriazocine derivative of the formula (IV) with a deacylating agent. Suitable examples of the deacylating agent include organic and inorganic base materials, for example, a wide variety of organic amines, alcoholates, ammonia and basic salts of ammonia, inorganic hydroxides and basic salts of the inorganic hydroxides, and the like. Of these base materials, organic amines and alcoholates are preferred because of their appropriate solubilities in various solvents. Preferred base materials are aminopyridines, thiourea and sodium ethyl alcoholates. Each of these base materials may be used in an amount of from 0.1 to 100 molar equivalent, and preferably 1 to 3 molar equivalent on the basis of the compounds (IV).

The reaction between the compounds (IV) and the deacylating agent is preferably carried out in the presence of an inert solvent, for example, halogenated hydrocarbon such as chloroform, methylene chloride, benzene-series solvent such as benzene and toluene, lower alcohol such as ethanol and the like. The reaction proceeds at room temperature but can be preferably accelerated if the temperature is in the range of from 30° to 70°C.

The isolation of the desired product from the reaction mixture can easily be effected by one of the well-known procedures. For example, any remaining deacylating agent is first removed from the reaction mixture, and thereafter the reaction mixture can be concentrated and cooled, or the concentrate obtained above can be treated with ethyl ether. Alternatively, the concentrate can be subjected to column chromatography using, for example, a silica gel column.

The 4-halogenoacetyltriazocine derivatives represented by the formula (IV) above are also included in the desired compounds of this invention. The compounds of the formula (IV) can be prepared by cyclizing the corresponding benzophenone derivatives of the formula

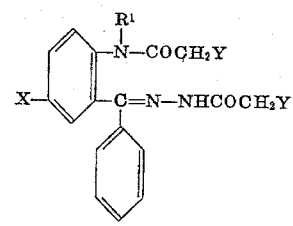

(V)

wherein X is as defined above, and $R^1$ represents an aralkyl group and Y represents a halogen atom.

The cyclization of the compounds (V) may be conducted by allowing the compounds (V) to stand at or near room temperatures. However, the cyclization can generally be promoted by effecting the cyclization under heating or under the presence of an alkaline agent such as sodium hydroxide. The cyclization is preferably carried out in the presence of an inert solvent, for example, benzene-series solvent, such as benzene and toluene, halogenated hydrocarbon such as chloroform, methylene chloride, carbon tetrachloride, and the like.

The benzophenone derivatives represented by the formula (V) can easily be prepared by reacting the corresponding benzophenonehydrazone represented by the formula

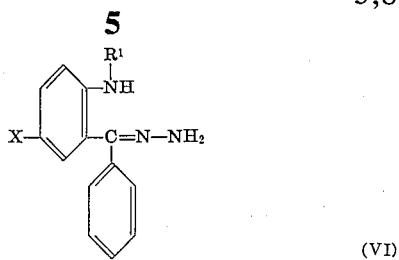

(VI)

wherein X and R¹ are as defined above, with a halogenoacetyl halide represented by the formula

Y - CO - CH₂ - Y     VII.

wherein Y is as defined above.

The reaction between the compound (VI) and the halogenoacetyl halide (VII) is preferably carried out in the presence of an inert organic solvent for example halogenated hydrocarbon such as chloroform, methylene chloride, carbon tetrachloride, benzene-series solvent such as benzene or toluene and the like. The reaction temperature is not critical but may be in the range of from 5° to 20°C. In this reaction, a suitable amount of the compound (VII) is more than an equimolar amount relative to the compound (VI) but generally better results can be obtained when the compound (VIII) is used in an equivalent molar excess amount. In order to conduct the reaction smoothly and to attain a high yield of the product, an appropriate condensing agent such as a small amount of sodium hydroxide, sodium bicarbonate, sodium carbonate may be used in the reaction.

The isolation of the compound (V) from the reaction mixture can easily be carried out by one of the well-known procedures. For example, the desired compound can be isolated by neutralizing the reaction mixture, concentrating the organic layer of the mixture and adding, for example, ethyl ether to the organic layer.

Alternatively, the 4-halogenoacetyl benzotriazocine derivatives (IV) can be prepared by directly subjecting the reaction mixture of the compounds (VI) and (VII) to cyclization without isolating the benzophenone derivatives (V) thus prepared from the reaction mixture. Thus, one of the features of the process of this invention is that 4-halogenoacetyl benzotriazocine derivatives represented by the formula (IV) can be prepared by reacting the benzophenonehydrazone of the formula (VI) with the halogenoacetyl halide of the formula (VII), and subjecting the resulting reaction mixture cyclization without isolating the resulting reaction product from the reaction mixture.

The cyclization product, i.e., the compound represented by the formula (IV), can easily be isolated from the reaction mixture by one of the well-known procedures for isolating products from the reaction mixture. For example, the reaction mixture can be concentrated under reduced pressure and the desired product can be precipitated by adding an appropriate solvent such as benzene, ethyl ether and the like to the resulting residue. If desired, the product thus obtained may be purified by one of the conventional procedures such as recrystallization, chromatography and the like.

The present invention is further illustrated by the following examples, but they are not to be construed as limiting the present invention.

EXAMPLE 1

0.5 g (0.00175 mol) of 8-chloro-3,4-dihydro-6-phenyl-1,4,5-benzotriazocin-2(1H)-one was dissolved in 4.5 ml of dimethylformamide and to the solution was added 0.1 g of sodium hydride (0.0021 mol) containing 50 percent mineral oil. The resulting mixture was then stirred for 1 hour at room temperature and a mixed solution of 0.45 g (0.00357 mol) of benzyl chloride and 1 ml of dimethylformamide was added to the mixture followed by stirring while warming on a water bath for 2 hours. After completion of the reaction, the reaction mixture was poured into water, and the resulting aqueous mixture was extracted with benzene. The extract was washed three times with water and, after being dried over anhydrous sodium sulfate, concentrated under reduced pressure. The residue thus obtained was then subjected to chromatography using a silica gel column and a developing solvent consisting of benzene:ethyl ether: chloroform (1:1:1; by volume). The eluate obtained from the column was then concentrated under reduced pressure and ethyl ether was added to the residue to give 1-benzyl-8-chloro-3,4-dihydro-6-phenyl-1,4,5-benzotriazocin-2(1H)-one as colorless crystals. The product had a melting point of 182°C after recrystallization from ethanol.

Analysis

Calcd. for $C_{22}H_{18}ClN_3O$: C, 70.30; H, 4.83; N, 11.18 (%)

Found : C, 70.53; H, 4.64; N, 10.92 (%)

EXAMPLE 2

In the same manner as described in Example 1, 1-benzyl-8-bromo-3,4-dihydro-6-phenyl-1,4,5-benzotriazocin-2(1H)-one as colorless crystals having a melting point of 180° – 181°C was prepared from 8-bromo-3,4-dihydro-6-phenyl-1,4,5-benzotriazocin-2(1H)-one.

Analysis

Calcd. for $C_{22}H_{18}BrN_3O$: C, 62.87; H, 4.32; N, 10.00 (%)

Found : C, 62.49; H, 4.21; N, 9.70 (%)

EXAMPLE 3

In the same manner as described in Example 1, 1-benzyl-3,4-dihydro-8-fluoro-6-phenyl-1,4,5-benzotriazocin-2(1H)-one as colorless crystals was prepared from 3,4-dihydro-8-fluoro-6-phenyl-1,4,5-benzotriazocin-2(1H)-one. The product had a melting point of 168°C after recrystallization from ethanol.

Analysis

Calcd. for $C_{22}H_{18}FN_3O$: C, 73.52; H, 5.05; N, 11.69 (%)

Found : C, 73.40; H, 4.95; N, 11.64 (%)

EXAMPLE 4

0.5 g (0.00188 mol) of 3,4-dihydro-8-methyl-6-phenyl-1,4,5-benzotriazocin-2(1H)-one was dissolved in 5 ml of dimethylformamide and to the solution was added 0.1 g of sodium hydride (0.0021 mol) containing 50 percent mineral oil. The resulting mixture was then stirred for 1 hour at room temperature and a mixed solution of 0.61 g (0.00357 mol) of benzyl bromide and 1 ml of dimethylformamide was added to the mixture followed by stirring while warming on a water bath for 2 hours. After completion of the reaction, the reaction mixture was poured into water, and the resulting aqueous mixture was extracted with chloroform. The extract was washed three times with water and, after being dried over anhydrous sodium sulfate, the solvent was distilled off under reduced pressure. The residue thus obtained was then subjected to chromatography using a silica gel column and a developing solvent consisting of benzene:ethyl ether:chloroform (1:1:1, by volume). The eluate obtained from the column was then concentrated under reduced pressure and ethyl ether was added to the residue to give 1-benzyl-3,4-dihydro-8-methyl-6-phenyl-1,4,5-benzotriazocin-2(1H)-one as colorless crystals. The product had a melting point of 160°C after recrystallization from ethanol.

Analysis

Calcd. for $C_{23}H_{21}N_3O$: C, 77.72; H, 5.96; N, 11.82 (%)

Found : C, 77.70; H, 5.70; N, 11.47 (%)

EXAMPLE 5

0.5 g (0.00199 mol) of 3,4-dihydro-6-phenyl-1,4,5-benzotriazocin-2(1H)-one was dissolved in 5 ml of dimethylformamide and to the solution was added 0.1 g of sodium hydride (0.0021 mol) containing 50 percent mineral oil. The resulting mixture was then stirred for 10 minutes at room temperature and a mixed solution of 0.45 g (0.00357 mol) and 1 ml of dimethylformamide was added to the mixture followed by stirring while warming on a water bath for 2 hours. After completion of the reaction, the reaction mixture was poured into water, and the resulting aqueous mixture was extracted with chloroform. The extract was washed with water and the solvent was distilled off under reduced pressure. The residue thus obtained was then subjected to chromatography using a silica gel column and a developing solvent consisting of benzene:ethyl ether:chloroform (1:1:1, by volume). The eluate obtained from the column was then concentrated and ethyl ether was added to the residue to give 1-benzyl-3,4-dihydro-6-phenyl-1,4,5-benzotriazocin-2(1H)-one as colorless crystals. The product had a melting point of 159°C after recrystallization from ethanol.

Analysis

Calcd. for $C_{22}H_{19}N_3O$: C, 77.40; H, 5.61; N, 12.31 (%)

Found : C, 77.72; H, 5.49; N, 12.09 (%)

EXAMPLE 6

4.5 g (0.017 mol) of 3,4-dihydro-8-methyl-6-phenyl-1,4,5-benzotriazocin-2(1H)-one was dissolved in 70 ml of dimethylformamide and to the solution was added 0.96 g of sodium hydride (0.020 mol) containing 50 percent mineral oil. The resulting mixture was then stirred for 10 minutes at room temperature. 30 ml of a solution of dimethylaminoethyl chloride (prepared from 4.90 g (0.034 mol) of dimethylaminoethylchloride hydrochloride) in toluene was added dropwise to the mixture and thereafter the resulting mixture was stirred for 1.5 hours at a temperature of 70°C. The reaction mixture was poured into ice-water, and the mixture was extracted with chloroform. The organic layer was washed with water, dried over anhydrous sodium sulfate and concentrated under reduced pressure. The residue thus obtained was then subjected to chromatography using a silica gel column and a developing solvent consisting of chloroform and methanol (20:1, by volume) to give 1-dimethylaminoethyl-3,4-dihydro-8-methyl-6-phenyl-1,4,5-benzotriazocin-2(1H)-one. The product had a melting point of 160° – 162°C after recrystallization from acetone-n-hexane.

Analysis

Calcd. for $C_{20}H_{24}N_4O$: C, 71.40; H, 7.19; N, 16.65 (%)

Found : C, 71.34; H, 7.09; N, 16.34 (%)

EXAMPLE 7

4.5 g (0.017 mol) of 3,4-dihydro-8-methyl-6-phenyl-1,4,5-benzotriazocin-2(1H)-one was dissolved in 70 ml of dimethylformamide and to the solution was added 0.97 g of sodium hydride (0.020 mol) containing 50 percent mineral oil. The resulting mixture was then stirred for 10 minutes at room temperature. 30 ml of a solution of diethylaminoethyl chloride (prepared from 5.85 g (0.034 mol) of diethylaminoethylchloride hydrochloride) in toluene was added dropwise to the mixture and thereafter the resulting mixture was stirred for 1.5 hours at a temperature of 70°C. The reaction mixture was poured into ice-water, and the mixture was extracted with chloroform. The organic layer was washed with water, dried over anhydrous sodium sulfate and concentrated under reduced pressure. The residue thus obtained was then subjected to column chromatography using a developing solvent consisting of chloroform and methanol (20:1, by volume) to give 1-diethylaminoethyl-3,4-dihydro-8-methyl-6-phenyl-1,4,5-benzotriazocin-2(1H)-one. The product had a melting point of 131° – 133°C after recrystallization from acetone-n-hexane.

Analysis

Calcd. for $C_{22}H_{28}N_4O$: C, 72.50; H, 7.74; N, 15.37 (%)

Found : C, 72.23; H, 7.72; N, 15.20 (%)

EXAMPLE 8

5 g (0.02 mol) of 3,4-dihydro-6-phenyl-1,4,5-benzotriazocin-2(1H)-one was dissolved in 50 ml of dimethylformamide and to the solution was added 1.44 g of sodium hydride (0.03 mol) containing 50 percent mineral oil. The resulting mixture was then stirred for 30 minutes at room temperature. 25 ml of a solution of diethylaminoethylchloride (prepared from 6.88 g (0.04 mol) of diethylaminoethylchloride hydrochloride) in toluene was then added dropwise to the mixture and thereafter the resulting mixture was stirred for 5 hours at room temperature. The reaction mixture was then poured into ice-water and the mixture was extracted with chloroform. The extract was washed three times with water, dried over anhydrous sodium sulfate and concentrated under reduced pressure to remove the solvent. The residue thus obtained was then subjected to chromatography using a silica gel column and a developing solvent consisting of chloroform and methanol (50:1, by volume). The eluate was concentrated under reduced pressure and hexane was added to an oily residue to give 1-(2 -diethylaminoethyl)-3,4-dihydro-6-phenyl-1,4,5-benzotriazocin-2(1H)-one as colorless crystals. The product had a melting point of 122° – 124°C after recrystallization from acetone-hexane.

Analysis

Calcd. for $C_{21}H_{26}N_4O$: C, 71.97; H, 7.48; N, 15.99 (%)

Found : C, 71.74; H, 7.45; N, 15.48 (%)

EXAMPLE 9

5 g (0.015 mol) of 8-bromo-3,4-dihydro-6-phenyl-1,4,5-benzotriazocin-2(1H)-one was dissolved in 50 ml of dimethylformamide and to the solution was added 0.864 g of sodium hydride (0.018 mol) containing 50 percent mineral oil. The resulting mixture was then stirred for 30 minutes at room temperature. 25 ml of a solution of diethylaminoethylchloride (prepared from 5.16 g (0.03 mol) of diethylaminoethylchloride hydrochloride) in toluene was then added dropwise to the mixture and the resulting mixture was stirred at room temperature for 1 hour and then at a temperature of 55°C for 1.5 hours. The reaction mixture was then poured into ice-water and the mixture was extracted with chloroform. The extract was washed three times with water, dried over anhydrous sodium sulfate and concentrated under reduced pressure. The residue thus obtained was then subjected to chromatography using a silica gel column and a developing solution consisting of chloroform and methanol (50:1, by volume). The eluate obtained from the column was concentrated under reduced pressure and hexane was added to an oily residue to give 8-bromo-1-(2-diethylaminoethyl)-3,4-dihydro-6-phenyl-1,4,5-benzotriazocin-2(1H)-one as colorless crystals. The product had a melting point of 133° – 134.5°C after recrystallization from acetone-hexane-ethyl ether.

Analysis

Calcd. for $C_{21}H_{25}BrN_4O$: C, 58.75; H, 5.87; N, 13.05 (%)

Found : C, 58.36; H, 5.83; N, 12.68 (%)

EXAMPLE 10

5 g (0.015 mol) of 8-bromo-3,4-dihydro-6-phenyl-1,4,5-benzotriazocin-2(1H)-one was dissolved in 50 ml of dimethylformamide and to the solution was added 0.864 g of sodium hydride (0.018 mol) containing 50 percent mineral oil. The resulting mixture was then stirred for 30 minutes at room temperature. 25 ml of a solution of dimethylaminoethylchloride (prepared from 4.32 g (0.03 mol) of dimethylaminoethylchloride hydrochloride) in toluene was then added dropwise to the mixture and the resulting mixture was stirred at a temperature of 60°C for 2 hours. The reaction mixture was then poured into ice-water and the mixture was extracted with chloroform. The extract was washed three times with water, dried over anhydrous sodium sulfate and concentrated under reduced pressure. The residue thus obtained was then subjected to chromatography using a silica gel column and a developing solvent consisting of chloroform and methanol (50:1, by volume). The eluate obtained from the column was concentrated under reduced pressure and hexane was added to an oily residue to give 8-bromo-1-(2-dimethylaminoethyl)-3,4-dihydro-6-phenyl-1,4,5-benzotriazocin-2(1H)-one as colorless crystals. The product had a melting point of 154° – 156°C after recrystallization from chloroform-hexane-ethyl ether.

Analysis

Calcd. for $C_{19}H_{21}BrN_4O$: C, 56.87; H, 5.27; N, 13.96 (%)

Found : C, 56.50; H, 5.14; N, 13.60 (%)

EXAMPLE 11

5 g (0.0175 mol) of 8-chloro-3,4-dihydro-6-phenyl-1,4,5-benzotriazocin-2(1H)-one was dissolved in 50 ml of dimethylformamide and to the solution was added 1.008 g of sodium hydride (0.021 mol) containing 50 percent mineral oil. The resulting mixture was then stirred for 30 minutes at room temperature. 25 ml of a solution of dimethylaminoethylchloride (prepared from 5.04 g (0.035 mol) of dimethylaminoethylchloride hydrochloride) in toluene was then added dropwise to the mixture and the resulting mixture was stirred at a temperature of 65°C for 1.5 hours. The reaction mixture was then poured into ice-water and the mixture was extracted with chloroform. The extract was washed three times with water, dried over anhydrous sodium sulfate and concentrated under reduced pressure. The residue thus obtained was then subjected to chromatography using a silica gel column and a developing solvent consisting of chloroform and methanol (50:1, by volume). The eluate obtained from the column was concentrated under reduced pressure and hexane was added to an oily residue to give 8-chloro-1-(2-dimethylaminoethyl)-3,4-dihydro-6-phenyl-1,4,5-benzotriazocin-2(1H)-one as colorless crystals. The product had a melting point of 140° – 142°C after recrystallization from acetone-hexane-ethyl ether.

Analysis

Calcd. for $C_{19}H_{21}ClN_4O$: C, 63.95; H, 5.93; N, 15.70 (%)

Found : C, 63.91; H, 5.88; N, 15.48 (%)

EXAMPLE 12

5 g (0.0175 mol) of 8-chloro-3,4-dihydro-6-phenyl-1,4,5-benzotriazocin-2(1H)-one was dissolved in 50 ml of dimethylformamide and to the solution was added 1.008 g of sodium hydride (0.021 mol) containing 50 percent mineral oil. The resulting mixture was then stirred for 30 minutes at room temperature. 25 ml of a solution of diethylaminoethylchloride (prepared from 6.02 g (0.035 mol) of diethylaminoethylchloride hydrochloride) in toluene was then added dropwise to the mixture and the resulting mixture was stirred at a temperature of 65°C for 1.5 hours. The reaction mixture was then poured into ice-water and the mixture was extracted with chloroform. The extract was washed three times with water, dried over anhydrous sodium sulfate and concentrated under reduced pressure. The residue thus obtained was then subjected to chromatography using a silica gel column and a developing solvent consisting of chloroform and methanol (50:1, by volume). The eluate obtained from the column was concentrated under reduced pressure and hexane was added to an oily residue to give 8-chloro-1-(2-diethylaminoethyl)-3,4-dihydro-6-phenyl-1,4,5-benzotriazocin-2(1H)-one as colorless crystals. The product had a melting point of 121.5° – 123.5°C after recrystallization from acetone-hexane.

Analysis

Calcd. for $C_{21}H_{25}ClN_4O$: C, 65.53; H, 6.55; N, 14.55 (%)

Found : C, 65.41; H, 6.64; N, 14.29 (%)

EXAMPLE 13

3 g (0.00604 mol) of 4-bromoacetyl-1-benzyl-8-chloro-3,4-dihydro-6-phenyl-1,4,5-benzotriazocin-2(1H)-one was dissolved in 50 ml of chloroform and the resulting solution was added to a solution of 12 g (0.1275 mol) of 2-aminopyridine dissolved in 100 ml of chloroform while stirring followed by allowing to react at a temperature of 50°C for 30 minutes. After allowing to cool to room temperature, the reaction mixture was adjusted to a pH of 1 with 1N hydrochloric acid. The chloroform layer was separated by a separatory funnel, washed three to five times with water, dried over anhydrous sodium sulfate and concentrated under reduced pressure. The residue thus obtained was then subjected to chromatography using a silica gel column and a developing solvent consisting of benzene:ethyl ether:chloroform (1:1:1, by volume). The eluate obtained from the column was concentrated under reduced pressure and ethyl ether was added to an oily residue to give 1-benzyl-8-chloro-3,4-dihydro-6-phenyl-1,4,5-benzotriazocin-2(1H)-one as colorless crystals. The product had a melting point of 182°C after recrystallization from ethanol.

Analysis

Calcd. for $C_{22}H_{18}ClN_3O$: C, 70.30, H, 4.83; N, 11.18 (%)

Found : C, 70.53; H, 4.64; N, 10.92 (%)

EXAMPLE 14

3 g (0.00625 mol) of 4-bromoacetyl-1-benzyl-3,4-dihydro-8-fluoro-6-phenyl-1,4,5-benzotriazocin-2(1H)-one was dissolved in 50 ml of chloroform and the resulting solution was added to a solution of 12 g (0.1275 mol) of 2-aminopyridine dissolved in 100 ml of chloroform while stirring followed by allowing to react at a temperature of 50°C for 30 minutes. After allowing to cool to room temperature, the reaction mixture was adjusted to a pH of 1 with 1N hydrochloric acid. The chloroform layer was separated by a separatory funnel, washed three to five times with water, dried over anhydrous sodium sulfate and concentrated under reduced pressure. The residue thus obtained was then subjected to chromatography using a silica gel column and a developing solvent consisting of benzene:ethyl ether:chloroform (1:1:1, by volume). The eluate obtained from the column was concentrated under reduced pressure and ethyl ether was added to an oily residue to give 1-benzyl-3,4-dihydro-8-fluoro-6-phenyl-1,4,5-benzotriazocin-2(1 H)-one as colorless crystals. The product had a melting point of 168°C after recrystallization from ethanol.

Analysis

Calcd. for $C_{22}H_{18}FN_3O$: C, 73.52; H, 5.05; N, 11.69 (%)

Found : C, 73.40; H, 4.95; N, 11.64 (%)

EXAMPLE 15

3.2 g (0.005912 mol) of 4-bromoacetyl-1-benzyl-8-bromo-3,4-dihydro-6-phenyl-1,4,5-benzotriazocin-2(1H)-one was mixed with 50 ml of chloroform, and to the mixture was added a solution of 14 g (0.148 mol) of 2-aminopyridine dissolved in chloroform followed by allowing to react for 30 minutes at a temperature in the range of from 40° to 50°C while stirring. After completion of the reaction, the solvent was distilled off under reduced pressure and the residue was adjusted to a pH of 4 with 1N hydrochloric acid. The mixture was then extracted with chloroform and the extract was washed with water, dried over anhydrous sodium sulfate and concentrated under reduced pressure. Ethyl ether was added to the residue thus obtained to give 1-benzyl-8-bromo-3,4-dihydro-6-phenyl-1,4,5-benzotriazocin-2(1H)-one as colorless crystals. The product had a melting point of 180° – 181°C after recrystallization from chloroform-ethyl ether-n-hexane.

Analysis

Calcd. for $C_{22}H_{18}BrN_3O$: C, 62.87; H, 4.32; N, 10.00 (%)

Found : C, 62.49; H, 4.21; N, 9.70 (%)

EXAMPLE 16

3 g (0.00649 mol) of 4-bromoacetyl-1-benzyl-3,4-dihydro-6-phenyl-1,4,5-benzotriazocin-2(1H)-one was dissolved in 50 ml of chloroform and the resulting solution was added to a solution of 12 g (0.1275 mol) of 2-aminopyridine dissolved in 100 ml of chloroform while stirring followed by allowing to react at a temperature of 50°C for 30 minutes. After allowing to cool to room temperature, the reaction mixture was adjusted to a pH of 1 with 1N hydrochloric acid. The chloroform layer was separated, washed three to five times with water, dried over anhydrous sodium sulfate and concentrated under reduced pressure. The residue thus obtained was then subjected to chromatography using a silica gel column and a developing solvent consisting of benzene:ethyl ether:chloroform (1:1:1, by volume). The eluate obtained from the column was concentrated under reduced pressure and ethyl ether was added to an oily residue to give 1-benzyl-3,4-dihydro-6-phenyl-1,4,5-benzotriazocin-2(1H)-one as colorless crystals. The product had a melting point of 159° C after recrystallization from ethanol.

Analysis

Calcd. for $C_{22}H_{19}N_3O$: C, 77.40; H, 5.61; N, 12.31 (%)

Found : C, 77.72; H, 5.49; N, 12.09 (%)

EXAMPLE 17

1 g (0.00185 mol) of 4-bromoacetyl-8-bromo-1-benzyl-3,4-dihydro-6-phenyl-1,4,5-benzotriazocin-2(1H)-one was dissolved in 20 ml of chloroform and the resulting solution was added to a solution of 0.9 g (0.0132 mol) of sodium ethoxide dissolved in 500 ml of ethanol while stirring followed by stirring at room temperature for 40 minutes. After completion of the reaction, a small amount of chloroform was added to the mixture which was then washed three times with water, dried over anhydrous sodium sulfate and concentrated under reduced pressure. The residue thus obtained was then subjected to chromatography using a silica gel column and a developing solvent consisting of benzene:ethyl ether:chloroform (1:1:1, by volume). The combined eluate was concentrated under reduced pressure and ethyl ether was added to the residue to give 1-benzyl-8-bromo-3,4-dihydro-6-phenyl-1,4,5-benzotriazocin-2(1H)-one as colorless crystals. The product had a melting point of 180° – 181°C after recrystallization from chloroform-ethyl ether-n-hexane, and showed no depression of melting point when admixed with the compound prepared in Example 15.

EXAMPLE 18

3 g (0.00630 mol) of 4-bromoacetyl-1-benzyl-3,4-dihydro-8-methyl-6-phenyl-1,4,5-benzotriazocin-2(1H)-one was dissolved in 50 ml of chloroform and the resulting solution was added to a solution of 12 g (0.1275 mol) of 2-aminopyridine dissolved in 100 ml of chloroform while stirring followed by allowing to react at a temperature of 55°C for 30 minutes. After allowing to cool to room temperature, the reaction mixture was adjusted to a pH of 1 with 1N hydrochloric acid. The chloroform layer was separated by a separatory funnel, washed three to five times with water, dried over anhydrous sodium sulfate and concentrated under reduced pressure. The residue thus obtained was then subjected to chromatography using a silica gel column and a developing solvent consisting of benzene:ethyl ether:chloroform (1:1:1, by volume). The eluate obtained from the column was concentrated under reduced pressure and ethyl ether was added to the residue to give 1-benzyl-3,4-dihydro-8-methyl-6- phenyl-1,4,5-benzotriazocin-2(1H)-one as colorless crystals. The product had a melting point of 160°C after recrystallization from ethanol.

Analysis

Calcd. for $C_{23}H_{21}N_3O$: C, 77.72; H, 5.96; N, 11.82 (%)

Found : C, 77.70; H, 5.70; N, 11.47 (%)

EXAMPLE 19

1 g (0.0021 mol) of 4-bromoacetyl-1-benzyl-3,4-dihydro-8-methyl-6-phenyl-1,4,5-benzotriazocin-2(1H)-one and subsequently 0.2 g (0.0026 mol) of thiourea were added to 50 ml of ethanol. After allowing to react the mixture for 1 hour at a temperature of 60°C while stirring, the mixture was heat-refluxed for 45 minutes. The solvent was then distilled off under reduced pressure and 15 ml of water was added to the residue. The aqueous mixture was then heat-refluxed for several minutes and, after allowing to cool, extracted with chloroform. The extract was washed three times with water, dried over anhydrous sodium sulfate and concentrated under reduced pressure. The residue thus obtained was then subjected to chromatography using a silica gel column and a developing solvent consisting of benzene:chloroform:ethyl ether (1:1:1, by volume). The eluate obtained from the column was concentrated under reduced pressure and ethyl ether was added to the residue to give colorless crystals. Recrystallization of the resulting crystals from ethanol yielded 1-benzyl-3,4-dihydro-8-methyl-6 -phenyl-1,4,5-benzotriazocin-2(1H)-one having a melting point of 160°C. The product showed no depression of melting point when admixed with the compound prepared in Example 18.

EXAMPLE 20

10 g (0.0332 mol) of 2-benzylamino-benzophenonehydrazone was dissolved in 200 ml of benzene and to this was then added a solution of 10 g (0.0943 mol) of sodium carbonate dissolved in 200 ml of water followed by stirring under ice-cooling. 40 g (0.198 mol) of bromoacetylbromide was then added dropwise to the mixture while maintaining a temperature of 5° to 10°C followed by stirring at a temperature of 15°C for 30 minutes. At this point, the reaction mixture was acidic and a 0.5 N aqueous sodium hydroxide solution was added thereto to make the mixture basic (approximately pH 10). The benzene layer was separated, washed with three to five times with water, dried over anhydrous sodium sulfate and concentrated under reduced pressure to give an oily residue. The resulting oil was then subjected to chromatography using a silica gel column and a developing solvent consisting of benzene:ethyl ether:chloroform (1:1:1, by volume). The eluate obtained from the column was concentrated under reduced pressure and ethyl ether was added to the resulting oily residue to give 4-bromoacetyl-1-benzyl-3,4-dihydro-6-phenyl-1,4,5-benzotriazocin-2(1H)-one as colorless crystals. The product had a melting point of 137°C after recrystallization from benzene-ethyl ether.

Analysis

Calcd. for $C_{24}H_{20}BrN_3O_2$: C, 62.35; H, 4.36; N, 9.09 (%)

Found : C, 62.32; H, 4.33; N, 8.87 (%)

EXAMPLE 21

10 g (0.0298 mol) of 2-benzylamino-5-chlorobenzophenonehydrazone was dissolved in 200 ml of benzene and to this was then added a solution of 10 g (0.0943 mol) of sodium carbonate dissolved in 200 ml of water followed by stirring under ice-cooling. 40 g (0.198 mol) of bromoacetylbromide was then added dropwise to the mixture while maintaining a temperature of 5° to 10°C followed by stirring at a temperature of 15°C for 30 minutes. At this point, the reaction mixture was acidic and a 0.5 N aqueous sodium hydroxide solution was added thereto to make the mixture basic (approximately pH 10). The benzene layer was separated, washed with three to five times with water, dried over anhydrous sodium sulfate and concentrated under reduced pressure to give an oily residue. The resulting oil was then subjected to chromatography using a silica gel column and a developing solvent consisting of benzene:ethyl ether:chloroform (1:1:1, by volume). The eluate obtained from the column was concentrated under reduced pressure and ethyl ether was added to the resulting oily residue to give 4-bromoacetyl-1-benzyl-8-chloro-3,4-dihydro-6-phenyl-1,4,5-benzotriazocin-2(1H)-one. The product had a melting point of 155°C after recrystallization from benzene-ethyl ether.

Analysis

Calcd. for $C_{24}H_{19}BrClN_3O_2$: C, 58.03; H, 3.86; N, 8.46 (%)

Found : C, 57.93; H, 3.83; N, 8.36 (%)

EXAMPLE 22

5 g (0.01314 mol) of 2-benzylamino-5-bromobenzophenonehydrazone was dissolved in 200 ml of benzene and the solution was cooled with stirring. A saturated aqueous solution of 8.4 g (0.1 mol) of sodium bicarbonate was added to the solution followed by addition of 25 g (0.1238 mol) of bromoacetylbromide in small portions while keeping the temperature of the mixture at a temperature in the range of 5° to 10°C. After completion of the addition, the mixture was stirred at a temperature in the range of from 10° to 15°C for 1 hour, and the mixture was adjusted to the pH of about 9 with a saturated aqueous sodium bicarbonate. The benzene layer was separated, washed with water, dried over anhydrous sodium sulfate and concentrated under reduced pressure. Ethyl ether and a small amount of benzene were added to the residue to give 1-benzyl-4-bromoacetyl-8-bromo-3,4-dihydro-6-phenyl-1,4,5-benzotriazocin2(1H)-one as colorless crystals. The product had a melting point of 145° – 146°C after recrystallization from chloroform-ethyl ether-n-hexane.

Analysis

Calcd. for $C_{24}H_{19}Br_2N_3O_2$: C, 53.26; H, 3.54; N, 7.76 (%)

Found : C, 53.00; H, 3.31; N, 7.35 (%)

EXAMPLE 23

10 g (0.0313 mol) of 2-benzylamino-5-fluorobenzophenonehydrazone was dissolved in 200 ml of benzene and to this was then added an aqueous solution of 10 g (0.0943 mol) of sodium carbonate dissolved in 200 ml of water followed by stirring while ice-cooling. 40 g (0.198 mol) of bromoacetylbromide was then added dropwise while keeping a temperature of 5° to 10°C and the mixture was stirred for an additional 30 minutes at a temperature of 15°C. At this point, the reaction mixture was acidic and was made basic (approximately pH 10) with a 0.5 N aqueous sodium hydroxide. The benzene layer was separated, washed three to five times with water, dried over anhydrous sodium sulfate and concentrated under reduced pressure to give an oily residue. The oily residue thus obtained was then subjected to chromatography using a silica gel column and a developing solvent consisting of benzene:ethyl ether:chloroform (1:1:1, by volume). The eluate obtained from the column was concentrated under reduced pressure and ethyl ether was added to the resulting oily residue to give 4-bromoacetyl-1-benzyl-3,4-dihydro-8-fluoro-6-phenyl-1,4,5-benzotriazocin-2(1H)-one as colorless crystals. The product had a melting point of 172° – 173°C after recrystallization from benzene-ethyl ether.

Analysis

Calcd. for $C_{24}H_{19}BrFN_3O_2$: C, 60.01; H, 3.99; N, 8.75 (%)

Found : C, 60.01; H, 3.92; N, 8.71 (%)

EXAMPLE 24

10 g (0.0317 mol) of 2-benzylamino-5-methylbenzophenonehydrazone was dissolved in 200 ml of benzene and to this was then added an aqueous solution of 10 g (0.0943 mol) of sodium carbonate dissolved in 200 ml of water followed by stirring while ice-cooling. 40 g (0.198 mol) of bromoacetylbromide was then added dropwise while keeping a temperature of 5° to 10°C and the mixture was stirred for an additional 30 minutes at a temperature of 15°C. At this point, the reaction mixture was acidic and was made basic (approximately pH 10) with a 0.5 N aqueous sodium hydroxide. The benzene layer was separated, washed three to five times with water, dried over anhydrous sodium sulfate and concentrated under reduced pressure to give an oily residue. The oily residue thus obtained was then subjected to chromatography using a silica gel column and a developing solvent consisting of benzene:ethyl ether:chloroform (1:1:1, by volume). The eluate obtained from the column was concentrated under reduced pressure and ethyl ether was added to the resulting oily residue to give 4-bromoacetyl-1-benzyl-3,4-dihydro-8-methyl-6-phenyl-1,4,5-benzotriazocin-2(1H)-one as colorless crystals. The product had a melting point of 145°C after recrystallization from benzene-ethyl ether.

Analysis

Calcd. for $C_{25}H_{22}BrN_3O_2$: C, 63.03; H, 4.66; N, 8.82 (%)

Found : C, 62.75; H, 4.64; N, 8.60 (%)

EXAMPLE 25

1 g (0.00173 mol) of 2-(N-benzyl)bromoacetamido-5-chlorobenzophenone bromoacetylhydrazone was dissolved in 100 ml of benzene and to this was then added 30 ml of a 0.5 N aqueous sodium hydroxide followed by stirring at room temperature. The benzene layer was separated, washed three to five times with an aqueous sodium chloride, dried over anhydrous sodium sulfate and concentrated under reduced pressure. Ethyl ether was then added to the resulting residue to give 4-bromoacetyl-1-benzyl-8-chloro-3,4-dihydro-6-phenyl-1,4,5-benzotriazocin-2(1H)-one as colorless crystals. The product had a melting point of 155°C after recrystallization from benzene-ethyl ether and showed no depression of melting point when admixed with the compound prepared in Example 21.

The starting material, 2-(N-benzyl)bromoacetamido-5-chlorobenzophenone bromoacetylhydrazone, used above was prepared as follows:

10 g (0.0298 mol) of 2-benzylamino-5-chlorobenzophenonehydrazone was dissolved in 200 ml of benzene and to this was then added a solution of 10 g (0.0943 mol) of sodium carbonate dissolved in 200 ml of water followed by stirring while ice-cooling. 40 g (0.198 mol) of bromoacetylbromide was added dropwise to the solution while keeping a temperature of 5° to 10°C and the resulting mixture was stirred for an additional 30 minutes at a temperature of 15°C. At this point, the reaction mixture was acidic and was adjusted to a pH of about 6 with an aqueous sodium carbonate. The benzene layer was separated, washed three to five times with an aqueous sodium chloride, dried over anhydrous sodium sulfate and concentrated under reduced pressure. Ethyl ether was added to the resulting residue to give 2-(N-benzyl)bromoacetamido-5-chlorobenzophenone bromoacetylhydrazone as colorless crystals. The product had a melting point of 165°C after recrystallization from benzene-ethyl ether.

Analysis

Calcd. for $C_{24}H_{20}Br_2ClN_3O_2$: C, 49.90; H, 3.49; N, 7.27 (%)

Found : C, 50.73; H, 3.58; N, 6.96 (%)

EXAMPLE 26

1 g (0.00184 mol) of 2-(N-benzyl)-bromoacetamidobenzophenone bromoacetylhydrazone was dissolved in 100 ml of benzene and to this was then added 30 ml of a 0.5 N aqueous sodium hydroxide followed by stirring at room temperature. The benzene layer was separated, washed three to five times with an aqueous sodium chloride, dried over anhydrous sodium sulfate and concentrated under reduced pressure. Ethyl ether was added to the resulting residue to give 4-bromoacetyl-1-benzyl-3,4-dihydro-6-phenyl-1,4,5-benzotriazocin-2(1H)-one. The product had a melting point of 137°C after recrystallization from benzene-ethyl ether and showed no depression of the melting point when admixed with the compound prepared in Example 20.

The starting material, 2-(N-benzyl)-bromoacetamidobenzophenone bromoacetylhydrazone, used above was prepared in the same manner as the preparation of the starting material of Example 25 but starting with 10 g (0.0332 mol) of 2-benzylaminobenzophenonehydrazone. The starting material thus produced had a melting point of 128°C after recrystallization from benzene-ethyl ether.

Analysis

Calcd. for $C_{24}H_{21}Br_2N_3O_2$: C, 53.06; H, 3.90; N, 7.73 (%)

Found : C, 53.08; H, 3.91; N, 7.75 (%)

EXAMPLE 27

1 g (0.00178 mol) of 2-(N-benzyl)bromoacetamido-5-fluorobenzophenone bromoacetylhydrazone was dissolved in 100 ml of benzene and the resulting solution was then worked up in the same manner as described in Example 26 to give 4-bromoacetyl-1-benzyl-3,4-dihydro-8-fluoro-6-phenyl-1,4,5-benzotriazocin-2(1H)-one as colorless crystals which had a melting point of 172° – 173°C after recrystallization from benzene-ethyl ether. The product thus obtained showed no depression of melting point when admixed with the compound prepared in Example 23.

The starting material, 2-(N-benzyl)bromoacetamido-5-fluorobenzophenone bromoacetylhydrazone, used above was prepared in the same manner as described for the preparation of the starting material of Example 25 but starting with 10 g (0.0313 mol) of 2- benzylamino-5-fluorobenzophenonehydrazone. The starting material had a melting point of 162°C after recrystallization from benzene-ethyl ether.

Analysis

Calcd. for $C_{24}H_{20}Br_2FN_3O_2$: C, 51.36; H, 3.59; N, 7.49 (%)

Found : C, 51.87; H, 3.52; N, 7.29 (%)

EXAMPLE 28

0.5 g (0.000804 mol) of 2-(N-benzyl)bromoacetamido-5-bromobenzophenone bromoacetylhydrazone was dissolved in 150 ml of benzene and to this was added 50 ml of a 1N aqueous sodium hydroxide followed by vigorous agitation for several minutes. The benzene layer was separated, washed three to five times with an aqueous sodium chloride, dried over anhydrous sodium sulfate and concentrated under reduced pressure. Ethyl ether was then added to the resulting residue and the mixture was allowed to stand in a refrigerator to give 1-benzyl-4-bromoacetyl-8-bromo-3,4-dihydro-6-phenyl-1,4,5-benzotriazocin-2(1H)-one as colorless crystals. The product had a melting point of 145° – 146°C after recrystallization from benzene-ethyl ether-n-hexane and showed no depression of melting point when admixed with the compound prepared in Example 22.

The starting material, 2-(N-benzyl)bromoacetamido-5-bromobenzophenone bromoacetylhydrazone, used above was prepared as follows.

2 g (0.00526 mol) of 2-benzylamino-5-bromobenzophenonehydrazone was dissolved in 120 ml of benzene and to this was added a solution of 2 g (0.0189 mol) of sodium carbonate dissolved in 50 ml of water followed by stirring under ice-cooling. 10 g (0.0495 mol) of bromoacetylbromide was added dropwise to the mixture at a temperature of 5 to 10°C and the stirring was continued for an additional 30 minutes at a temperature of 15°C. The benzene layer was separated, washed three to five times with an aqueous sodium chloride, dried over anhydrous sodium sulfate and concentrated under reduced pressure to give 2-(N-benzyl)-bromoacetamido-5-bromobenzophenone bromoacetylhydrazone as colorless crystals. The product had a melting point of 179° – 180°C after recrystallization from benzene-ethyl ether.

Analysis

Calcd. for $C_{24}H_{20}Br_3N_3O_2$: C, 46.33; H, 3.24; N, 6.75 (%)

Found : C, 46.30; H, 3.15; N, 6.54 (%)

EXAMPLE 29

0.2 g (0.00321 mol) of 2-(N-benzyl)bromoacetamido-5-bromobenzophenone bromoacetylhydrazone was dissolved in a mixture consisting of 20 ml of benzene, 20 ml of tetrahydrofuran and 0.5 ml of water and the solution was heat-refluxed for 3 hours. After allowing to cool, water was added to the mixture, and the benzene layer was separated, washed three to five times with water, dried over anhydrous sodium sulfate and concentrated under reduced pressure. The residue thus obtained was then subjected to chromatography using a silica gel column and a developing solvent consisting of benzene:ethyl ether:chloroform (1:1:1, by volume). The second eluate obtained from the column was concentrated under reduced pressure and ethyl ehter was added to the resulting oily residue to give 1-benzyl-4-bromoacetyl-8-bromo-3,4-dihydro-6-phenyl-1,4,5-benzotriazocin-2(1H)-one as colorless crystals. The product had a melting point of 146°C after recrystallization from benzene-ethyl ether-n-hexane and showed no depression of melting point when admixed with the compound prepared in Example 22.

EXAMPLE 30

1 g (0.00180 mol) of 2-(N-benzyl)bromoacetamido-5-methylbenzophenone bromoacetylhydrazone was worked up in the same manner as Example 26 to give 4-bromoacetyl-1-benzyl-3,4-dihydro-8-methyl-6-phenyl-1,4,5-benzotriazocin-2(1H)-one as colorless crystals. The product had a melting point of 145°C after recrystallization from benzene-ethyl ether and showed no depression of melting point when admixed with the compound prepared in Example 24.

The starting material, 2-(N-benzyl)bromoacetamido-5-methylbenzophenone bromoacetylhydrazone, used above was prepared in the same manner as described for the preparation of the starting material of Example 25 but starting with 10 g (0.0317 mol) of 2-benzylamino-5-methylbenzophenonehydrazone. The starting material thus obtained had a melting point of 166°C after recrystallization from benzene-ethyl ether.

Analysis

Calcd. for $C_{25}H_{23}Br_2N_3O_2$: C, 53.38; H, 4.16; N, 7.54 (%)

Found : C, 53.94; H, 4.13; N, 7.43 (%)

While the invention has been described in detail and with reference to specific embodiments thereof, it will be apparent to one skilled in the art that various changes and modifications can be made therein without departing from the spirit and scope thereof.

What is claimed is:

1. A compound of the formula

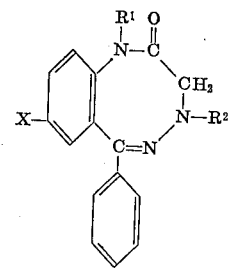

wherein X represents a hydrogen atom, a halogen atom or a lower-alkyl group, and $R^1$ represents a dilower-alkyl amino-lower-alkyl group or a benzyl group, $R^2$ represents a hydrogen atom or a halogenoacetyl group.

2. A compound according to claim 1 of the formula

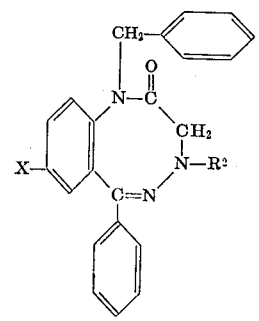

wherein X represents a hydrogen atom, a halogen atom or a lower-alkyl group, and R² represents a hydrogen atom or a halogenoacetyl group.

3. A compound according to claim 1 of the formula

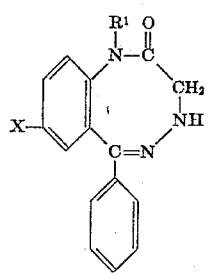

wherein X represents a hydrogen atom, a halogen atom or a lower-alkyl group, R¹ represents a dilower-alkylamino-lower-alkyl group.

4. A compound according to claim 1 of the formula

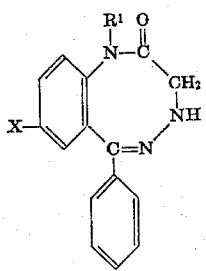

wherein X represents a hydrogen atom or a halogen atom, and R¹ represents a dilower-alkylamino-lower-alkyl group.

5. A compound according to claim 1 of the formula

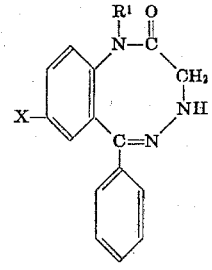

wherein X represents A lower-alkyl group, and R¹ represents a dilower-alkylamino-lower-alkyl group.

6. A compound in accordance with claim 1 wherein X represents a hydrogen atom, a halogen atom or a methyl group, R¹ represents a dimethylaminoethyl group, a diethylaminoethyl group or a benzyl group, and R² represents a hydrogen atom or a halogenoacetyl group.

7. A compound in accordance with claim 2 wherein X represents a hydrogen atom, a halogen atom or a methyl group, R² represents a hydrogen atom or a halogenoacetyl group.

8. A compound in accordance with claim 3 wherein X represents a hydrogen atom, a halogen atom or a methyl group, R¹ represents a dimethylaminoethyl group or a diethylaminoethyl group.

* * * * *